United States Patent

Nozaki et al.

[11] Patent Number: 5,835,635
[45] Date of Patent: Nov. 10, 1998

[54] METHOD FOR THE RECOGNITION AND COMPLETION OF CHARACTERS IN HANDWRITING, AND COMPUTER SYSTEM

[75] Inventors: Hiroshi Nozaki, Yokohama; Nobuyasu Itoh, Kawasaki, both of Japan

[73] Assignee: Interntional Business Machines Corporation, Armonk, N.Y.

[21] Appl. No.: 495,725

[22] Filed: Jun. 27, 1995

[30] Foreign Application Priority Data

Sep. 22, 1994 [JP] Japan ..................................... 6-227559

[51] Int. Cl.⁶ ........................................................ G06K 9/00
[52] U.S. Cl. .......................................... 382/226; 382/229
[58] Field of Search .................................... 382/226, 227, 382/228, 229, 230; 395/794, 795

[56] References Cited

U.S. PATENT DOCUMENTS

| | | | |
|---|---|---|---|
| 4,989,258 | 1/1991 | Takahashi | 382/226 |
| 5,067,165 | 11/1991 | Nishida | 382/226 |
| 5,067,166 | 11/1991 | Ito | 382/226 |
| 5,151,950 | 9/1992 | Hullender | 382/226 |
| 5,497,432 | 3/1996 | Nishida | 382/178 |
| 5,524,066 | 6/1996 | Kaplan | 382/229 |

FOREIGN PATENT DOCUMENTS

| | | |
|---|---|---|
| 1134585 | 5/1989 | Japan . |
| 4120679 | 4/1992 | Japan . |
| 4289989 | 10/1992 | Japan . |
| 5-233600 | of 1993 | Japan ............................. G06F 15/20 |
| 5128300 | 5/1993 | Japan . |
| 5233600 | 9/1993 | Japan . |
| 6187502 | 7/1994 | Japan . |

OTHER PUBLICATIONS

Sugimura et al A Study of Reject Correction for Character Recognition, Yokosuka Elec. Comm. Lab., N.T.T. Yokosuka, 238 Japan.

*Primary Examiner*—Yon Couso

[57] ABSTRACT

A method for providing an effective completion of characters required in inputting a partial character string. The method includes the steps of: (a) creating read candidate character strings from a character pattern input by said digitizer; (b) getting next nodes next to nodes corresponding to the read candidate character strings from the tree dictionary, and creating predicted character strings connecting the read candidate character strings with characters corresponding to the next nodes, and data on their certainties; (c) counting a number of the predicted character strings; (d) if the number is equal of more than maximum number N that is able to indicate to users, displaying the predicted character strings in a sequence from the largest of the data on the certainties on the display device; and (e) if the number is less than the maximum number N, determining until which nodes in the tree dictionary should be displayed by referring to the data on the certainties, and displaying the strings on the display device.

10 Claims, 4 Drawing Sheets

METHOD FOR THE RECOGNITION AND COMPLETION OF CHARACTERS IN HANDWRITING, AND COMPUTER SYSTEM

FIELD OF THE INVENTION

The present invention relates to the recognition of characters in handwriting, particularly to a device and method possessing both functions of character recognition and character completion in handwriting.

BACKGROUND OF THE INVENTION

Corresponding to requirements for using a portable computer or facilitating the operation with pen input, a small computer with a built-in tablet has been developed. In addition to such aspects of use as to directly display and store input with a pen, there is another aspect of online character recognition in which characters are able to be written in a given space so that the written characters can be recognized by a computer. This online character recognition is not yet widely used, mainly because of the problems in the recognition rate, but also because of poor development in the input technique making the most of online character recognition.

That is, a computer with such a built-in tablet enables data to be input by tapping with a virtual keyboard when inputting only numerals and satisfactorily by the use of a menu-driven approach if the word data can be divided into a few group of words even when inputting even when inputting words. Thus, input by using the online character recognition technique is limited almost entirely to the case of inputting any of large quantities of words unable to be divided into as many subsets as are put into a menu.

Under these circumstances, to promote input efficiency with the problem of character recognition in mind, a function is useful which completes the rest of a word and displays all characters when a writer writes partial rather than complete character strings.

As one example of using this completion function, an editor shell in keyboard input can be cited (cf. R. Stallman, GNU Emacs Manual, 1987; and Joy, An Introduction to the C shell, 4.3 BSD Manual). Since the objective of this example is the completion of file names or shell variables, a simple format is adopted which displays words relevant to the input partial character strings when there is a plurality of relevant words. This method offers no problem in this example, because the partial strings that have been input are not ambiguous and the number of words in concern is several hundreds at most, except for an extreme case, so that candidate words completed can be displayed in a sufficiently short list form. However, when the number of words in question becomes noticeably large, it is impractical to display all possible character strings for an input. Further, when the number of words is large, there is also a means to display words in the sequence of frequency of occurrence. However, an attempt to input other words than can be recognized at a glance will compel a writer to perform complicated scrolling.

One example of displaying candidate words is described in PEPA 5-50786, in which a writer inputs all characters and candidate words for recognition, which are then provided together with their probabilities. However, no description is found of performing a completion of characters in addition to the display of candidate words for the recognition of characters.

PUPA 5-189621 describes a means to change the sequence of candidates for recognition of characters by referencing their chain frequencies. However, no description is found of performing a completion of characters from partial character strings.

SUMMARY OF THE INVENTION

It is one object of the present invention to enhance the efficiency of character input in the recognition of characters.

It is another object of the present invention to efficiently complete the characters required when inputting a partial character string.

Means for Solving the Problems

To accomplish these objects, the present invention is configured as follows:

In a computer system having a tree dictionary, a digitizer for inputting characters, a display device, wherein said tree dictionary includes a plurality of nodes corresponding to each character and stores in each of said nodes an occurrence ratio of a character string corresponding to characters from a root of said tree dictionary to each node, a method for performing character recognition and completion in handwriting, comprising the steps of: (a) creating read candidate character strings from a character pattern input by said digitizer; (b) getting next nodes next to nodes corresponding to said read candidate character strings from said tree dictionary, and creating predicted character strings connecting said read candidate character strings with characters corresponding to said next nodes, and data on their certainties; (c) counting a number of said predicted character strings; (d) if said number is equal of more than maximum number N that is able to indicate to users, displaying said predicted character strings in a sequence from the largest of said data on said certainties on said display device; and (e) if said number is less than said maximum number N, determining until which nodes in said tree dictionary should be displayed by referring to said data on said certainties, and displaying said strings on said display device. This method enables dynamic switching between displaying characters to a user down to the next character (as well as predicted character strings) next to the read candidate character strings (left partial strings in the embodiment) and displaying further character strings (e.g., words).

Herein, the step (e) comprising the steps of: (f) developing one of said predicted character strings into words including said one of said predicted character strings by referring to said dictionary, and creating data on certainties for said words; (g) rearranging candidate character strings including said words and other of said predicted character strings in a sequence from the largest of said data on said certainties; (h) determining whether said candidate character strings on and after the top N+1th string in the sequence of said step (g) can be discarded or not; (i) displaying said predicted character strings on said display device if they are not determined to be discardable in said step (h); and (j) displaying said words on said display device if they are determined to be discardable in said step (h) even after developing all of said predicted character strings into words, displaying the words on the display device. This modification may enable even words to be displayed and so a user can perform more efficient input. Also, an appropriate measure can be taken even when the display of words is not required.

Also, the step (e) comprising the steps of: (k) developing said predicted character strings into words including said predicted character strings by referring to said dictionary, and creating data on certainties for said words; (l) rearranging said words in a sequence from the largest of said data on certainties; (m) determining whether said words on and after the top N+1th string in the sequence of said step (1) can be discarded or not; (n) displaying said predicted character strings on said display device if they are not determined to be discardable in said step (m); and (o) displaying the words on the display device if they are determined to be discardable in said step (m). This method is a simplification of the aforesaid one by developing predicted character strings into words.

Further, the step (e) comprising the steps of: (p) developing one of said predicted character strings into character strings corresponding to nodes from said one of said predicted character strings to predetermined number subsequent strings by referring to said dictionary, and creating data on certainties for said character strings; (q) rearranging candidate character strings including said character strings and other of said predicted character strings in a sequence from the largest of said data on certainties; (r) determining whether said candidate character strings on and after the top N+1th string in the sequence of said step (q) can be discarded or not; (s) displaying said predicted character strings on said display device if they are not determined to be discardable in said step (r); and (t) displaying said character strings on said display device if they are determined to be discardable in said step (r) even after developing all of said predicted character strings into said character strings, displaying the character strings on said display device. This modification enables not only words but also character strings composed of a plurality of characters predicted from read candidate character strings to be displayed to a user.

Still further, the step (e) comprising the steps of: (u) developing said predicted character strings into character strings corresponding to nodes from said predicted character strings to predetermined number subsequent strings by referring to said dictionary, and creating data on certainties for said character strings; (v) rearranging said character strings in a sequence from the largest of said data on certainties; (w) determining whether said character strings on and after the top N+1th string in the sequence of said step (v) can be discarded or not; (x) displaying said predicted character strings on said display device if they are not determined to be discardable in said step (w); and (y) displaying said words on said display device if they are determined to be discardable in said step (w), displaying the character strings on said display device. This method is a simplification of the aforesaid one by predicting a plurality of characters.

The methods mentioned above produce similar advantages on devices for implementing these methods also.

BRIEF DESCRIPTION OF THE DRAWINGS

FIG. 4 comprising FIGS. 4A and 4B is a high-level flowchart according to the present invention.

Figure 1:
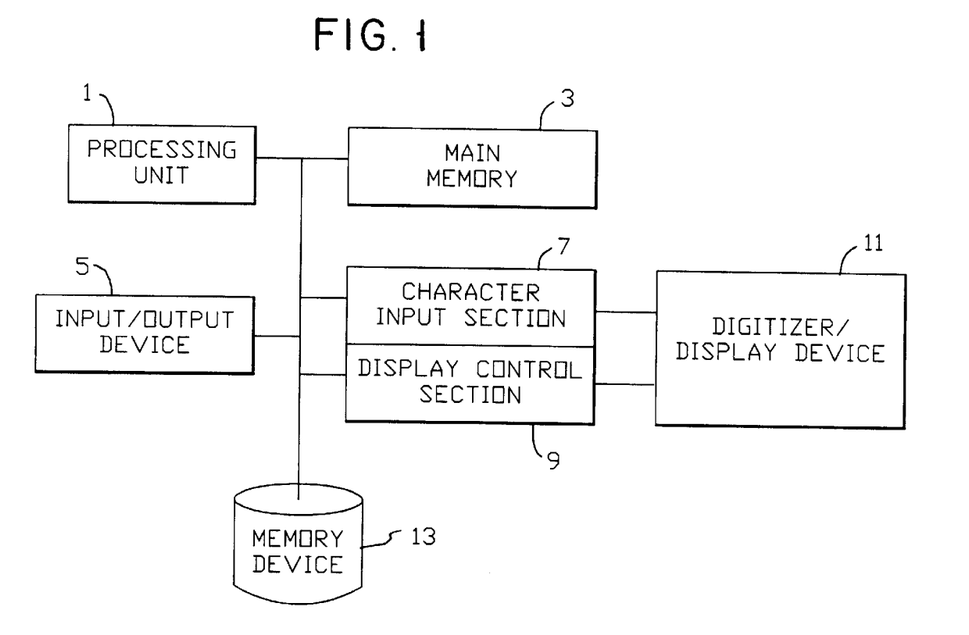
FIG. 1 is a block diagram of one embodiment of a device constitution according to the present invention.

FIG. 1 shows one embodiment of an arrangement according to the present invention. A processing unit 1 is connected to a main memory 3 and performs an arithmetic operation by using programs and data stored in the main memory 3. An input/output device 5, including a keyboard, mouse, printer, and other attached units, inputs instructions and data for the processing unit 1 or other related means and outputs required data. To perform the input of characters with a pen or other writing tools, the present invention has a digitizer/display device 11 formed by integrating an input devices such as a tablet and the like and a so-called display. A display feature of the digitizing/display device 11, to which the display controller 9 is connected, operates in cooperation with the processing unit 1. An input feature of the digitizer/display device 11 controls the character input section 7, which sends information read from the digitizer/display device 11 to the processing unit 1 where input characters are identified. Here, the digitizer/display device 11 is described as an integrated one but a digitizer and display may be installed separately. However, to integrate them can make possible the miniaturization of the whole arrangement and favors portability. Such a graphics tablet indication device as a pen depends upon the scheme of the digitizer/display device 11 and is not essential to the present invention, and a detailed description thereof will be omitted. The memory device 13 is such a device as a hard disk for storing data to be loaded into the main memory 3. Here, data includes a dictionary used for the completion of characters.

Figure 2:
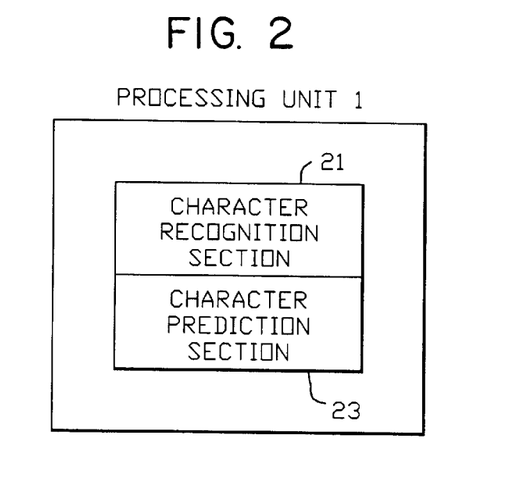
FIG. 2 is a block diagram of one embodiment of a processing unit according to the present invention.

FIG. 2 is a block diagram of the processing unit 1 shown in FIG. 1. The processing unit 1 is roughly divided into a character recognition section 21 and a character prediction section 23. The character recognition section 21 performs the manipulation for the identification of characters corresponding to read information input from the character input section 7, and multiple predicates are chosen in the sequence of certainty. This manipulation does not differ in any point from the conventional and so will not be described further.

The character prediction section 23, when a partial character string is input, predicts subsequent letter(s) or complete words on the basis of the recognized results for the character recognition section 21, where a dictionary calculates and stores each individual branch rate from one character to another character. This tree dictionary assumes a tree structure derived from left partial strings (also referred to as left character strings) having words in common (in the present invention, trees extend from the left to the right and characters are also described from the left to the right, however, either direction will do) and each node corresponds to a character.

Figure 3:
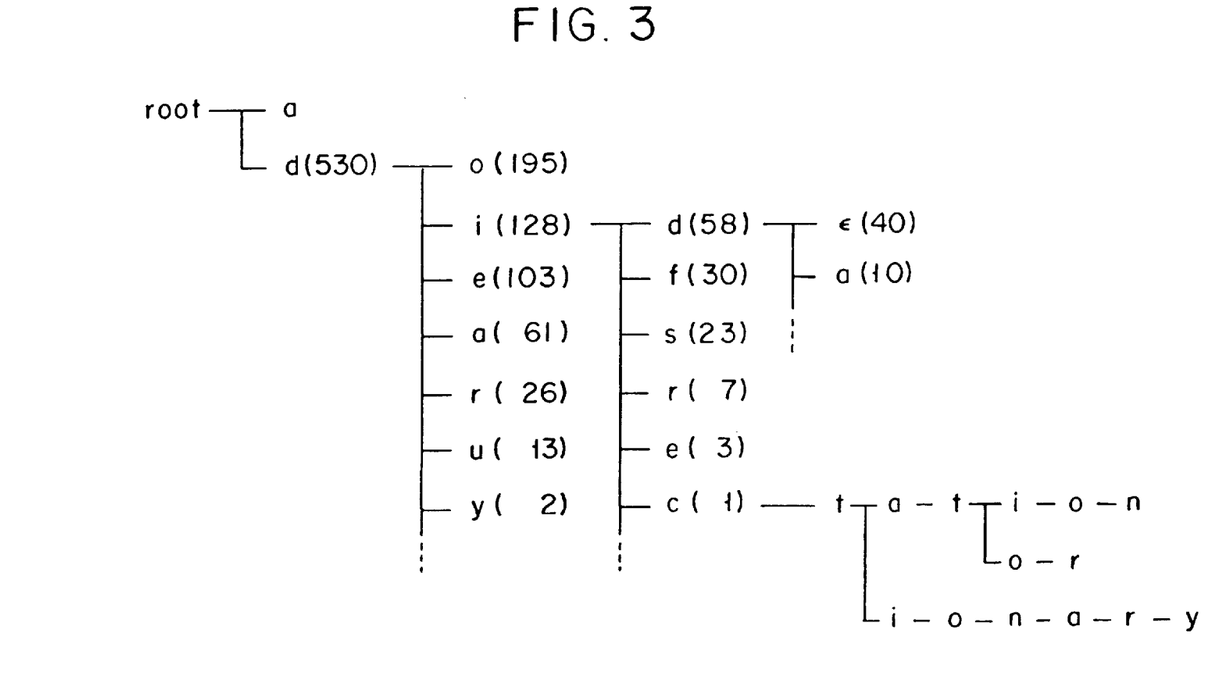
FIG. 3 is a partial tree diagram of one embodiment of a tree dictionary to be used in the present dictionary.

For example, FIG. 3 shows one example of a partial tree related to 'd' in an English dictionary. This tree dictionary with branch rates holds not only a character and a pointer to one of the child nodes but also the branch rate from the root node to a certain node on each node. A branch rate is obtained by calculating the sum total of frequencies for words relevant to a certain partial tree and normalizing it in terms of the number of occurrences of all words. That is, to sum all branch rates of child nodes related to a certain node provides the branch rate of the relevant node itself. For example, to sum the branch rates of 'did*', 'dif*', 'dis*', 'dir*', 'die*', 'dic*', and other candidates, where * represents the presence of subsequent characters, having in common the left partial string 'di' provides the occurrence ratio of the character string 'di', i.e., the branch rate from the root node to 'di' (128=58+30+23+7+3+1+...). This value of 128 is a numeral given for the convenience of explanation and depends also upon the number of all characters in a dictionary, but is divided by a fixed number to yield an accurate branch rate. Incidentally, a certain word may be the end of a word and further there may be another word with characters subsequent to it, or a certain word may be the left partial string of another word. That is, 'did' may be the left string of 'didactic', but it may end with 'did' and so the node for representing this ending (designated by ε in FIG. 3) is set where to store the branch rate of 'did'.

Figures 4, 4B:
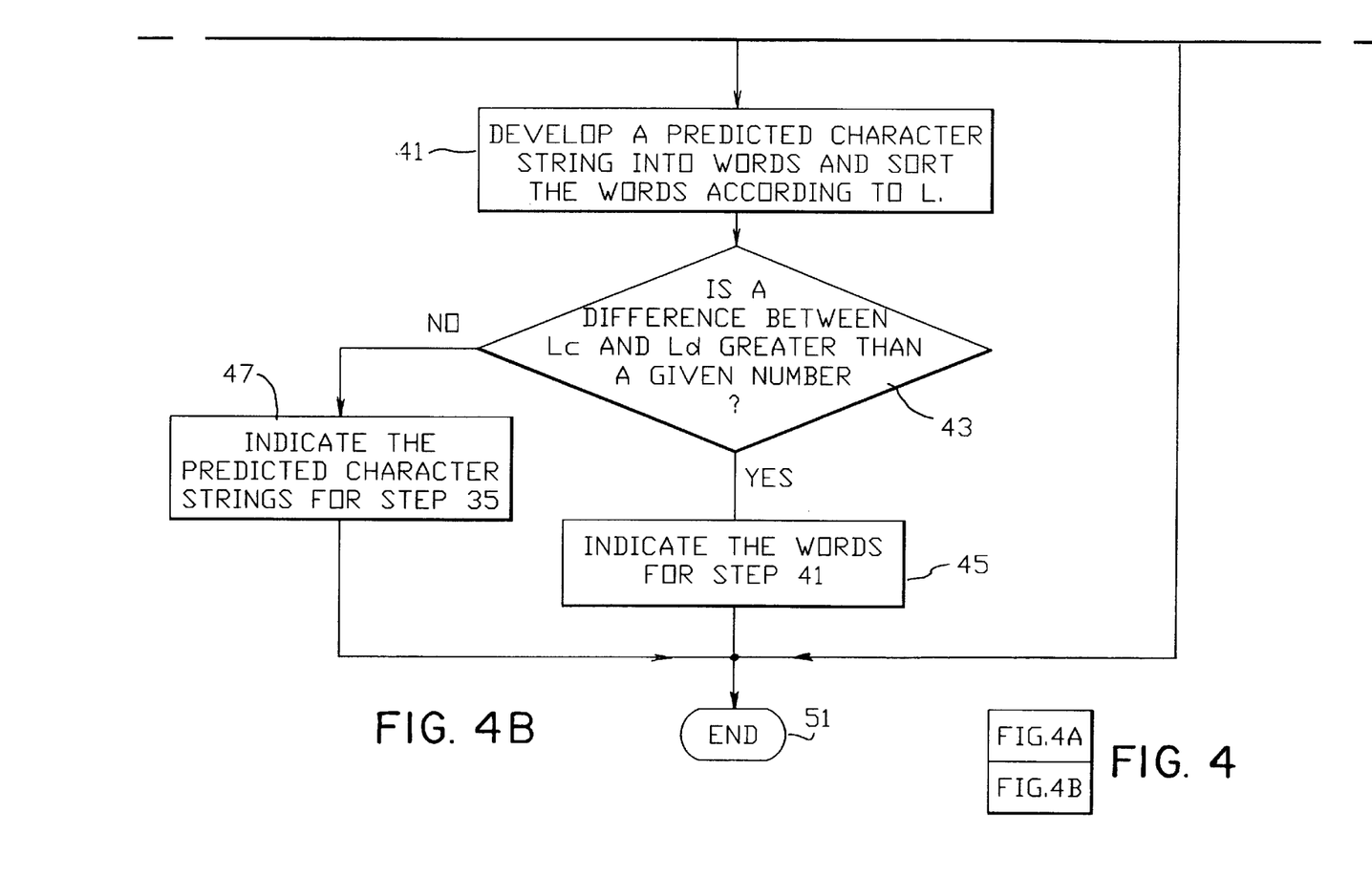
Figure 4A:
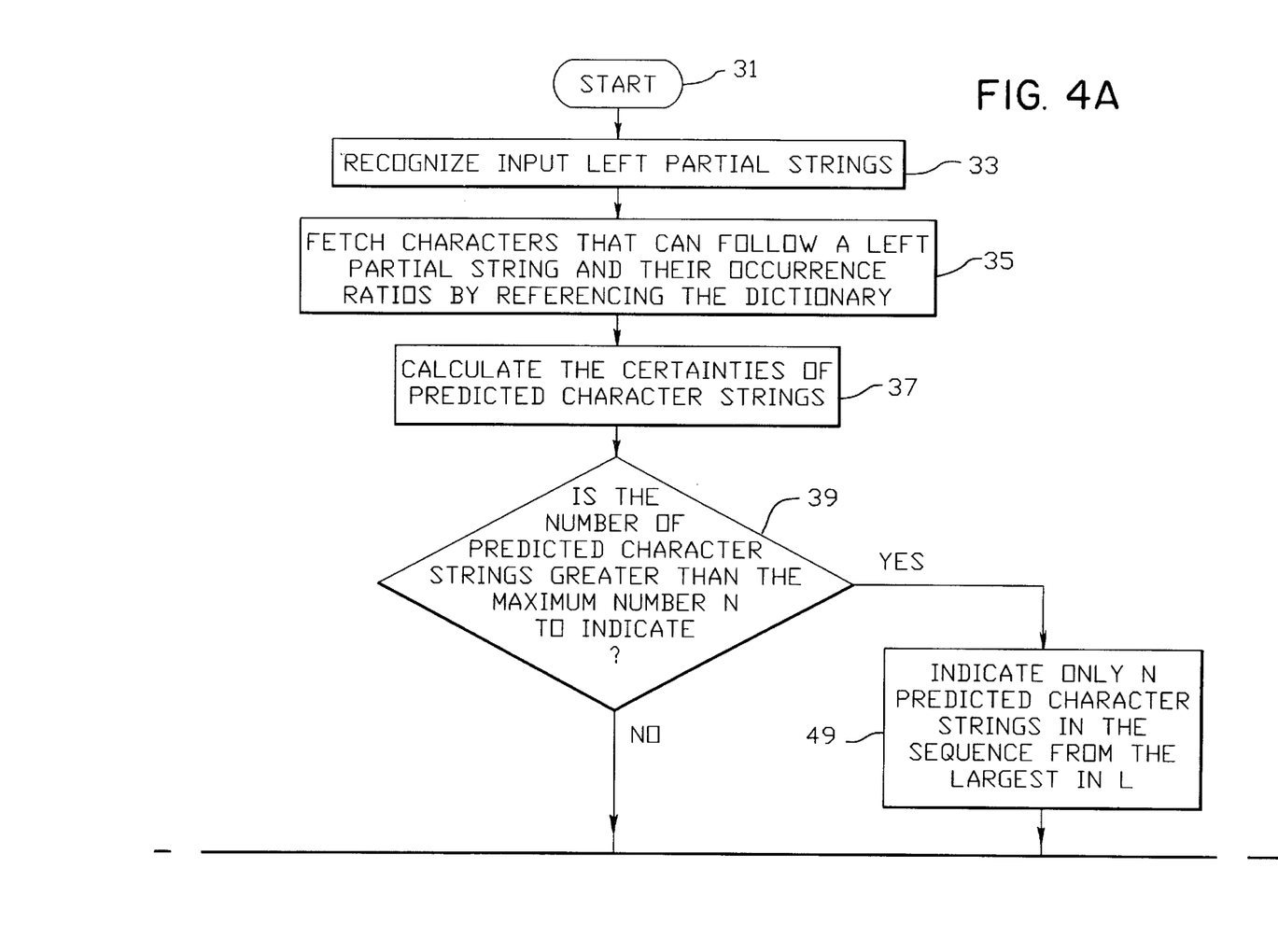

In this way, the character prediction section 23 uses the aforesaid tree dictionary with branch rates and performs operations shown in FIG. 4 (FIGS. 4A and 4B).

That is, operations conform to the following algorithm: Recognize read candidate character strings from read information that has been input from the digitizer/display device 11 through the character input section 7 (Step 33). As a result, a plurality of character strings is usually recognized as candidates. For every read candidate character string recognized, gain characters that can follow it and their occurrence ratios (branch rates) by referencing to the tree dictionary (Step 35). Here, since a read candidate character string recognized has its respective certainty, the certainties of character strings extending from the read candidate character string to characters that can follow it (hereinafter referred to as predicted character string.) can be also recognized. Calculate the certainties L of predicted character strings (Step 37).

At this time, determine whether the number of predicted character strings is greater than the greatest possible number N to be indicated to a user as candidate character strings or not (Step 39). If said number is greater, display only N predicted character strings in the sequence from the largest in L (Step 49). If said number is smaller, however, not only one character but also more characters can be predicted because more candidates can be still indicated to a user. Here, develop a predicted character string into words and sort the words in the sequence from the largest in L (Step 41). If a difference between the sum total Lc of L in the top N words and the sum total Ld of L in the N+1th word and after is greater than a given number, indicate to a user the words predicted by development (Step 45). If a difference between Lc and Ld is smaller than a given number, indicate the predicted character strings because to develop them into words is meaningless (Step 47).

This algorithm will be described in more detail together with the background theories.

From the recognized result (in online character input, enter characters for every column since there are recognition candidates for every column and all candidates forms a matrix, designate the matrix with M) for the left partial strings entered (assumed to be n−1 characters), calculate the occurrence ratio of a character string to be actually written to comprise $c_1, c_2, \ldots c_{n-1}, c_n$, inclusive, by using a tree dictionary with branch rates.

Since characters c1, c2, ... $c_{n-1}$ corresponding a written left partial character string have various possibilities depending on the recognized result, designate this part with $T_j$. Then, work on the calculation of a conditional probability $P(T_j, c_n|M)$. Here, since $P(c_n|T_j)$ is obviously independent of the recognized result M and is Markovian, it is only necessary to calculate and estimate a value of $L=P(T_j|M) * P(c_n|T_j)$. $P(T_j|M)$ can be decomposed in Expression 1 with the aide of Bayes' theorem.

$$P(T_j|M) = \frac{P(T_j)P(M|T_j)}{\sum_k (P(T_k)P(M|T_k))} \quad \text{Expression 1}$$

Since the denominators are common to all character strings $T_j$, it is only necessary to determine the largeness in numerator alone. Accordingly, L can be transformed as follows:

$$L = P(T_1)P(M|T_j) * (P(c_n,T_1)/P(T_j))$$
$$= P(c_n,T_j) * P(M|T_j)$$

The first half of this expression is the probability of the occurrence of the character string '$T_j c_n$' and so corresponds to the branch rate mentioned above. The second half should be the certainty of '$T_j$' to be obtained from recognition. However, to establish an accurate value for this certainty requires a large number of experiments. For now, it can be approximated as Expression 2 by using the likelihood $S_{ci}$ at the time of recognizing a character recognition candidate '$c_1$' (i=1, ... n−1). Meanwhile, α in Expression 2 is a normalization constant.

$$P(M|T_j) = \alpha \sum_{i=1}^{n-1} S_{ci} \quad \text{Expression 2}$$

On estimating the expression mentioned above of L, character strings inclusive of the next character are predicted. This value of L will be the basis for determining whether or not to determine the candidate sequence of completed character strings and further predict subsequent characters, or to develop further nodes beyond a child node in the dictionary.

Thus, a provision for the concrete description of individual steps described above is established. First, Step 33 is a step for recognizing input left partial strings, where more than one character string usually becomes candidates as described above. Consequently, the number of candidate character strings may be considerably large. In such cases, it is advisable to calculate the value of Expression 2 for each $T_j$ and then narrow candidate character strings down on the basis of the values obtained for various M. This procedure is similar to that of the beam search frequently used for the recognition of voices and accordingly will not been further described.

Step 35 refers to the dictionary mentioned above for each candidate character string $T_j$ obtained in Step 33 and fetchs characters that can follow it and their occurrence ratios $P(T_j, c_n)$.

Step 37 calculates the aforesaid L for each predicted character string composed of a candidate character string and one of the characters obtained in Step 35 that can follow it. L is a product of a probability of $T_j$, Expression 2, and a occurrence ratio of $c_n$, $P(T_j, c_n)$.

Here, rearrange the predicted character strings in the sequence from the largest in L to indicate them in the sequence of certainty at the time of display.

Then, count the number of predicted character strings. If the number of predicted character strings is greater than the greatest possible number N to be indicated to a user, indicate N predicted character strings to a user in the sequence from the largest in L (Step 49).

If the number of predicted character strings is smaller than N, to indicate further candidates to a user enables the input efficiency to be enhanced. Thus, reference child nodes of the tree dictionary in the sequence of certainty. The present embodiment develops each predicted character string into words having it as the respective partial character strings in the sequence from the largest in L while L values of words are also calculated.

Whenever developing a predicted character string, rearrange candidate character strings constituted of obtained words and undeveloped character strings in the sequence from the largest in L. If a difference between the sum total of L in the top N candidate character strings, Lc, and that of L in the N+1th and further candidate character strings, Ld, is greater than a given number, the N+1th and further candidate character strings have so small a possibility of being chosen that there is no problem even when they are discarded. Accordingly, discard the N+1th and subsequent candidate character strings. However, hold Ld and add it to Ld obtained when developing other predicted character strings.

If a difference between Lc and Ld is smaller than a given number, interrupt the development into words because it is understood that the N+1th and further candidate character strings to be discarded have a sufficient possibility of being chosen. Then, indicate the predicted character strings to a user as candidate character strings.

If the difference between Lc and Ld is greater than a given number, perform the operation mentioned above also for another predicted character string. Then, perform a similar operation and determine whether to develop it into words is appropriate or not. Continue the operation described above until undeveloped predicted character strings are no longer found, and, finally, if the difference between Lc and Ld is greater than a given number, indicate the words of the top N candidate character strings to a user.

The embodiment of Steps 41 to 47 of the flowchart shown in FIG. 4 (FIGS. 4A and 4B) is described in the above, but if a system has sufficient capacity and capability, it is possible to develop all predicted character strings into words in the beginning. However, since the capacity of the main memory or the capability of the processing unit is limited as is the ordinary case, a description of the relevant embodiment is more efficient. The results are the same for either implementation.

Thus, input efficiency can be elevated by a user choosing a desired word or partial word among candidates for which character completion has been accomplished with a sufficiently high possibility.

Aside from such switching of the indication between the next one character and words as is described above, the present invention can be also extended in such a manner as to predict as many characters as circumstances permit. For example, when developing child nodes of predicted character strings into candidate character strings, calculating L for individual candidate character strings, sorting them, and calculating Lc and Ld, if the difference between Lc and Ld is greater than a given number, to indicate candidate character strings (character strings down to child nodes of predicate character strings) to a user is similarly possible.

Let us consider the processing in the example of FIG. 3. Here, Symbol + represents only the relevant character string forms a word. For example, when inputting 'di', the method described above processes only words among individual child nodes of did*, dif*, dis*, dir*, die*, dic*, . . . . In contrast to this, a procedure to predict a plurality of candidate character strings must consider child nodes of 'did*', such as 'did+' and 'dida*', as candidate character strings.

Having been described as related to the embodiment, the present invention is not limited to the specific embodiment. For example, for narrowing input character strings $T_j$ down, the beam search method is proposed, but other methods can be substituted. Also, the number of candidates to be indicated to a user is arbitrary and may be arranged for however many there are able to set up. Further, though an environment to write characters in an appointed column is established for online character recognition, where to write in is not limited to a columns if recognition is possible without column in the user interface.

The present invention will be described using an example of English words, but its application is not limited thereto. For example, the present invention can be applied to the character recognition and character completion of Japanese names written in kana (Japanese syllabary). Both of them resemble each other from the standpoint of the recognition rate of characters and information capacity as phonetic symbols, and are similar in quantity. Incidentally, the use of Japanese kanji (Chinese characters) and the statistical property of addresses is more efficient for character completion in inputting addresses and does not fall within the main scope of the present invention.

ADVANTAGES OF THE INVENTION

As described above, the effective switching between ending with a prediction of one character and accomplishing the prediction of words permits a balance between the numerical restrictions on the characters able to be indicated and the requirement that it is desirous to further predict as many characters as possible. Furthermore, the present invention enables the prediction of a plurality of characters and so has become more efficient.

This improvement enables the efficiency of character input to be improved.

Still further, a dynamic change in the length of characters to be predicted permits more precise character strings to be indicated to a user.

We claim:

1. In a computer system having a tree dictionary, a digitizer for inputting characters, a display device, wherein said tree dictionary includes a plurality of nodes corresponding to each character and stores in each of said nodes an occurrence ratio of a character string corresponding to characters from a root of said tree dictionary to each node, a method for performing character recognition and completion in handwriting, comprising the steps of:

(a) creating read candidate character strings from a character pattern input by said digitizer, said input character pattern being at least a partial character pattern;

(b) getting next nodes next to nodes corresponding to said read candidate character strings from said tree dictionary, and creating predicted character strings connecting said read candidate character strings with characters corresponding to said next nodes, and data on their certainties;

(c) counting a number of said predicted character strings;

(d) if said number is equal or more than maximum number N that is able to indicate to users, displaying said predicted character strings in a sequence from the largest of said data on said certainties on said display devices; and (e) if said number is less than said maximum number N, determining until which nodes in said tree dictionary should be displayed by referring to said data on said certainties, and displaying said strings on said display device;

wherein information dynamically displayed to the user may not only include predicted character strings but also characters associated with nodes in said tree dictionary, depending on a limitation set by the maximum number N.

2. The method as set forth in claim 1, wherein the step (e) comprising the steps of:

(f) developing one of said predicted character strings into words including said one of said predicted character strings by referring to said dictionary, and creating data on certainties for said words;

(g) rearranging candidate character strings including said words and other of said predicted character strings in a sequence from the largest of said data on said certainties;

(h) determining whether said candidate character strings on and after the top N+1th string in the sequence of said step (g) can be discarded or not;

(i) displaying said predicted character strings on said display device if said candidate character strings are not determined to be discardable in said step (h); and (j) displaying said words on said display device if said candidate character strings are determined to be discardable in said step (h) even after developing all of said predicted character strings into words.

3. The method as set forth in claim 1, wherein the step (e) comprising the steps of:

(k) developing said predicted character strings into words including said predicted character strings by referring to said dictionary, and creating data on certainties for said words;

(l) rearranging said words in a sequence from the largest of said data on certainties;

(m) determining whether said words on and after the top N+1th string in the sequence of said step (1) can be discarded or not;

(n) displaying said predicted character strings on said display device if said words are not determined to be discardable in said step (m); and (o) displaying said words on said display device if said words are determined to be discardable in said step (m).

4. The method as set forth in claim 1, wherein the step (e) comprising the steps of:

(p) developing one of said predicted character strings into character strings corresponding to nodes from said one of said predicted character strings to predetermined number subsequent strings by referring to said dictionary, and creating data on certainties for said character strings;

(q) rearranging candidate character strings including said character strings and other of said predicted character strings in a sequence from the largest of said data on certainties;

(r) determining whether said candidate character strings on and after the top N+1th string in the sequence of said step (q) can be discarded or not;

(s) displaying said predicted character strings on said display device if said candidate character strings are not determined to be discardable in said step (r); and (t) displaying said predicted character strings on said display device if said candidate character strings are determined to be discardable in said step (r) even after developing all of said predicted character strings into said character strings.

5. The method as set forth in claim 1, wherein the step (e) comprising the steps of:

(u) developing said predicted character strings into character strings corresponding to nodes from said predicted character strings to predetermined number subsequent strings by referring to said dictionary, and creating data on certainties for said character strings;

(v) rearranging said character strings in a sequence from the largest of said data on certainties;

(w) determining whether said character strings on and after the top N+1th string in the sequence of said step (v) can be discarded or not;

(x) displaying said predicted character strings on said display device if said character strings are not determined to be discardable in said step (w); and (y) displaying said words on said display device if said character strings are determined to be discardable in said step (w).

6. A computer system, comprising:

1) a tree dictionary including a plurality of nodes corresponding to each character and storing in each of said nodes an occurrence ratio of a character string corresponding to characters from a root of said tree dictionary to each node;

2) a digitizer for inputting characters;

3) a display device;

4) means for creating read candidate character strings from a character pattern input by said digitizer, said input character pattern being at least a partial character pattern;

5) means for getting next nodes next to nodes corresponding to said read candidate character strings from said tree dictionary, and creating predicted character strings connecting said read candidate character strings with characters corresponding to said next nodes, and data on their certainties;

6) means for counting a number of said predicted character strings;

7) means for displaying said predicted character strings in a sequence from the largest of said data on said certainties on said display device if said number is equal or more than maximum number N that is able to indicate to users; and 8) means for determining until which nodes in said tree dictionary should be displayed by referring to said data on said certainties if said number is less than said maximum number N, and displaying said strings on said display device;

wherein information dynamically displayed to the user may not only included predicted character strings but also characters associated with nodes in said tree dictionary, depending on a limitation set by the maximum number N.

7. The computer system as set forth in claim 6, wherein said means 8) comprising:

9) means for developing one of said predicted character strings into words including said one of said predicted character strings by referring to said dictionary, and creating data on certainties for said words;

10) means for rearranging candidate character strings including said words and other of said predicted character strings in a sequence from the largest of said data on said certainties;

11) means for determining whether said candidate character strings on and after the top N+1th string in the sequence rearranged by said means 10) can be discarded or not; and 12) means for displaying said predicted character strings on said display device if said means 11) does not determine said candidate character strings can be discardable, and displaying said words on said display device if said means 11) determines said candidate character strings can be discardable even after developing all of said predicted character strings into words.

8. The computer system as set forth in claim 6, wherein said means 8) comprising:

13) means for developing said predicted character strings into words including said predicted character strings by referring to said dictionary, and creating data on certainties for said words;

14) means for rearranging said words in a sequence from the largest of said data on certainties;

15) means for determining whether said words on and after the top N+1th string in the sequence rearranged by said means 14) can be discarded or not; and 16) means for displaying said predicted character strings on said display device if said means 14) does not determine said words can be discardable, and displaying said words on said display device if said means 14) determine said words can be discardable.

9. The computer system as set forth in claim 6, wherein said means 8) comprising:

17) means for developing one of said predicted character strings into character strings corresponding to nodes from said one of said predicted character strings to predetermined number subsequent strings by referring to said dictionary, and creating data on certainties for said character strings;

18) means for rearranging candidate character strings including said character strings and other of said predicted character strings in a sequence from the largest of said data on certainties;

19) means for determining whether said candidate character strings on and after the top N+1th string in the sequence rearranged by said means 18) can be discarded or not; and 20) means for displaying said predicted character strings on said display device if said means 19) does not determine said candidate character strings can be discardable, and displaying said character strings on said display device if said means 19) determines said candidate character strings can be discardable even after developing all of said predicted character strings into said character strings.

10. The computer system as set forth in claim 6, wherein said means 8) comprising:

21) means for developing said predicted character strings into character strings corresponding to nodes from said predicted character strings to predetermined number subsequent strings by referring to said dictionary, and creating data on certainties for said character strings;

22) means for rearranging said character strings in a sequence from the largest of said data on certainties;

23) means for determining whether said character strings on and after the top N+1th string in the sequence rearranged by said means 22) can be discarded or not; and 24) means for displaying said predicted character strings on said display device if said means 23) does not determine said character strings can be discardable, and displaying said words on said display device if said means 23) determines said character strings can be discardable.

* * * * *